United States Patent [19]
Maurer

[11] Patent Number: 5,482,312
[45] Date of Patent: Jan. 9, 1996

[54] INFLATOR FOR A VEHICLE AIR BAG ASSEMBLY AND A METHOD OF MAKING THE SAME

[75] Inventor: Steven W. Maurer, Fraser, Mich.

[73] Assignee: TRW Vehicle Safety Systems Inc., Cleveland, Ohio

[21] Appl. No.: 265,499

[22] Filed: Jun. 23, 1994

Related U.S. Application Data

[63] Continuation of Ser. No. 885,147, May 18, 1992, abandoned.

[51] Int. Cl.⁶ .................................................. B60R 21/16
[52] U.S. Cl. ....................................... 280/728.1; 280/741
[58] Field of Search ........................... 280/728 A, 736, 280/741, 732, 728 R; 102/530, 531; 29/507, 512, 522.1, 523

[56] References Cited

U.S. PATENT DOCUMENTS

| | | | |
|---|---|---|---|
| 2,815,255 | 12/1957 | Phillips et al. | 29/522.1 |
| 2,905,124 | 9/1959 | Henchert. | |
| 3,913,421 | 10/1975 | Hawkins | 29/523 |
| 4,204,312 | 5/1980 | Tooker | 29/523 |
| 4,734,265 | 3/1988 | Nilsson et al. | 422/165 |
| 4,890,860 | 1/1990 | Schneither | 280/741 |
| 4,907,819 | 3/1990 | Cuevas | 280/736 |
| 4,923,212 | 5/1990 | Cuevas | 280/736 |
| 4,938,501 | 7/1990 | Wipasuramonton | 280/743 |
| 5,000,479 | 3/1991 | Werner et al. | 280/736 |
| 5,058,921 | 10/1991 | Cuevas | 280/741 |
| 5,131,145 | 7/1992 | Badoureaux | 29/523 |

FOREIGN PATENT DOCUMENTS

| | | |
|---|---|---|
| 2320389 | 10/1974 | Germany. |
| 2555343 | 6/1976 | Germany. |
| 505677 | 6/1939 | United Kingdom. |
| 947558 | 1/1964 | United Kingdom. |

OTHER PUBLICATIONS

VSI Automation Assembly "VSI SpinnOmatic" description.

*Primary Examiner*—Edwin L. Swinehart
*Attorney, Agent, or Firm*—Calfee Halter & Griswold

[57] ABSTRACT

A method of making an inflator (10) for an air bag assembly includes the step of providing a first housing member (12) having a recess (22) and a second housing member (14) having a coupling portion (24). One of the housing members, preferably the first housing member (12), includes a container (20). A source of inflation fluid (18) is loaded into the container (20). The second housing member (14) is positioned so that its coupling portion (24) is adjacent to, but outside of, the recess (22). The coupling portion (24) is then mechanically deformed towards the recess (22) to form an integral projection (26) which is tightly received within the recess (22). In this manner, the first housing member (12) is coupled to the second housing member (14) to form a closed chamber (16) containing the source of inflation fluid (18). In the inflator (10) according to the present invention, the coupling portion (24) has a deformation pattern consistent with the coupling portion (24) being initially positioned entirely outside the recess (22) and then being mechanically displaced towards the recess (22) to form the projection 26.

24 Claims, 6 Drawing Sheets

INFLATOR FOR A VEHICLE AIR BAG ASSEMBLY AND A METHOD OF MAKING THE SAME

This is a continuation of application Ser. No. 07/885,147 filed on May 18, 1992 now abandoned.

FIELD OF THE INVENTION

This invention relates to an inflator for a vehicle air bag assembly and a method of making the same.

BACKGROUND OF THE INVENTION

A vehicle air bag assembly functions to protect a vehicle occupant during a crash or collision. The principal components of a vehicle air bag assembly are a receptacle, an air bag located within the receptacle, and an inflator positioned to supply inflation fluid to the air bag. When the inflator supplies the inflation fluid, the air bag is forced out of the receptacle and inflated. In this manner, the air bag will cushion a vehicle occupant against impact with a structural part of the vehicle. On the driver side of a vehicle, an air bag assembly is commonly incorporated into the vehicle steering wheel. On the passenger side of a vehicle, an air bag assembly is commonly incorporated into the vehicle instrument panel.

A typical inflator includes first and second housing members which are coupled together to form a closed chamber for a source of inflation fluid. The fluid source may comprise a gas generating composition which, when ignited, rapidly generates an inert non-toxic gas, such as nitrogen, to inflate the air bag. During this generation process, the inflator will be subjected to intense thermal and mechanical stresses. For example, in a driver side air bag assembly, pressures in the range of 3000 psi are commonly produced during the generation process. In a passenger side air bag assembly, significantly higher pressures approaching 10,000 psi are typically encountered. Consequently, the inflator housing members, and the coupling between these housing members, must be able to withstand these stresses.

In the past, inflator housing members have been coupled together by threaded coupling arrangements (see e.g. U.S. Pat. No. 4,938,501 to Wipasuramonton) and welded coupling arrangements (see e.g. U.S. Pat. No. 4,890,860 to Shneiter). These coupling arrangements, while sufficient to withstand the stresses of the gas generation process, have not been compatible with certain manufacturing concerns. For example, threaded coupling arrangements require that the machining of the threads at a very tight tolerance (0.003 inch) and a close inspection of the threads to ensure that such tolerances are met. Consequently, the machining of the threads is an expensive process. With respect to welded coupling arrangements, such arrangements usually necessitate the use of thick housing members and/or costly, time-consuming weld inspections.

Another manner of coupling together inflator housing members is set forth in U.S. Pat. No. 4,907,819 to Ceuvas. This patent, which is directed towards an inflator for a driver side air bag assembly, disclose a "non-welded" coupling arrangement between inflator housing members. Specifically, the Ceuvas inflator housing members are coupled together by rolling a coupling portion, or skirt, of a first housing member radially inward over a peripheral edge of a second housing member.

The Ceuvas patent notes that this "non-welded" coupling arrangement eliminates the manufacturing disadvantages commonly associated with threaded and/or welded coupling arrangements. However, applicant believes that the Ceuvas coupling technique can not be used with an inflator for a passenger side air bag assembly. The housing members, which the Ceuvas patent states are preferably aluminum, must be of a suitable thickness to withstand the stresses of the generation process. While applicant believes that an aluminum housing member having a thickness in the range of 0.050 inch could withstand driver-side stresses, applicant also believes that an aluminum housing member would have to possess a thickness in the range of 0.25 inch to withstand significantly higher passenger-side stresses. Applicant believes that a housing member having a thickness in this range could not be easily and/or effectively rolled inwardly to form the Ceuvas coupling arrangement.

Additionally, it is often desirable for inflator housing members to be coupled together in a manner which is tamperproof. "Tamperproof" in this context means that the inflator housing members cannot be uncoupled with standard tools, such as a screw driver or a conventional wrench. This feature is sometimes particularly important in passenger-side air bag assemblies because portions of the inflator will be accessible during mechanical repair of the vehicle.

For these reasons, applicant believes a need exists for an inflator coupling arrangement which: (i) may be used with both driver-side and passenger-side air bag assemblies; (ii) is compatible with manufacturing design concerns; and (iii) is tamperproof.

SUMMARY OF THE INVENTION

The present invention provides a coupling arrangement which may be used with inflator housing members of varying thicknesses and therefore may be used with both driver side and passenger side air bag assemblies. Additionally, the coupling arrangement eliminates the manufacturing disadvantages commonly associated with threaded and/or welded coupling arrangements. Still further, the inflator coupling arrangement prevents the inflator housing members from being easily uncoupled with standard tools.

More particularly, the present invention provides a method of making an inflator for an air bag assembly. The method comprises the step of providing a first housing member and a second housing member. The first housing member has a recess and the second housing member has a coupling portion. One of the housing members, preferably the first housing member, includes a container. A source of an inflation fluid is loaded into the container. The second housing member is the positioned so that its coupling portion is adjacent to, but outside of, the recess. Thereafter, the coupling portion is mechanically deformed towards the recess to form an integral projection which is tightly received within the recess. In this manner, the first housing member is coupled to the second housing member to form a closed chamber containing the source of inflation fluid.

The present invention also provides an inflator for an air bag assembly. The inflator includes a first housing member, a second housing member coupled to the first housing member to form a closed chamber, and a source of inflation fluid contained within the chamber. The first housing member has a recess and the second housing member has a coupling portion which includes an integral projection tightly received within the recess. The coupling portion has a deformation pattern consistent with the method of the present invention. Specifically, the coupling portion has a deformation pattern consistent with it being initially positioned entirely outside the recess and then being mechanically displaced towards the recess to form the projection. The inflator may be incorporated into an air bag assembly which additionally includes an air bag and a receptacle in which the air bag is located.

In the preferred embodiment, the inflator includes a container having an open end, a closure cap closing the open end of the container to form a closed chamber, and a gas generating composition contained within the chamber. The container includes a groove opening towards the container's axis and the closure cap includes an integral projection tightly received within this groove. The inflator is preferably designed for use in a passenger side air bag assembly. To this end, the container is cylindrical in shape and has an axial dimension substantially greater than its radial dimension.

These and other features of the invention are fully described and particularly pointed out in the claims. The following descriptive annexed drawings set forth in detail one illustrative embodiment of the invention. However this embodiment is indicative of but one of the various ways in which the principles of the invention may be employed.

DETAILED DESCRIPTION

Figure 1:
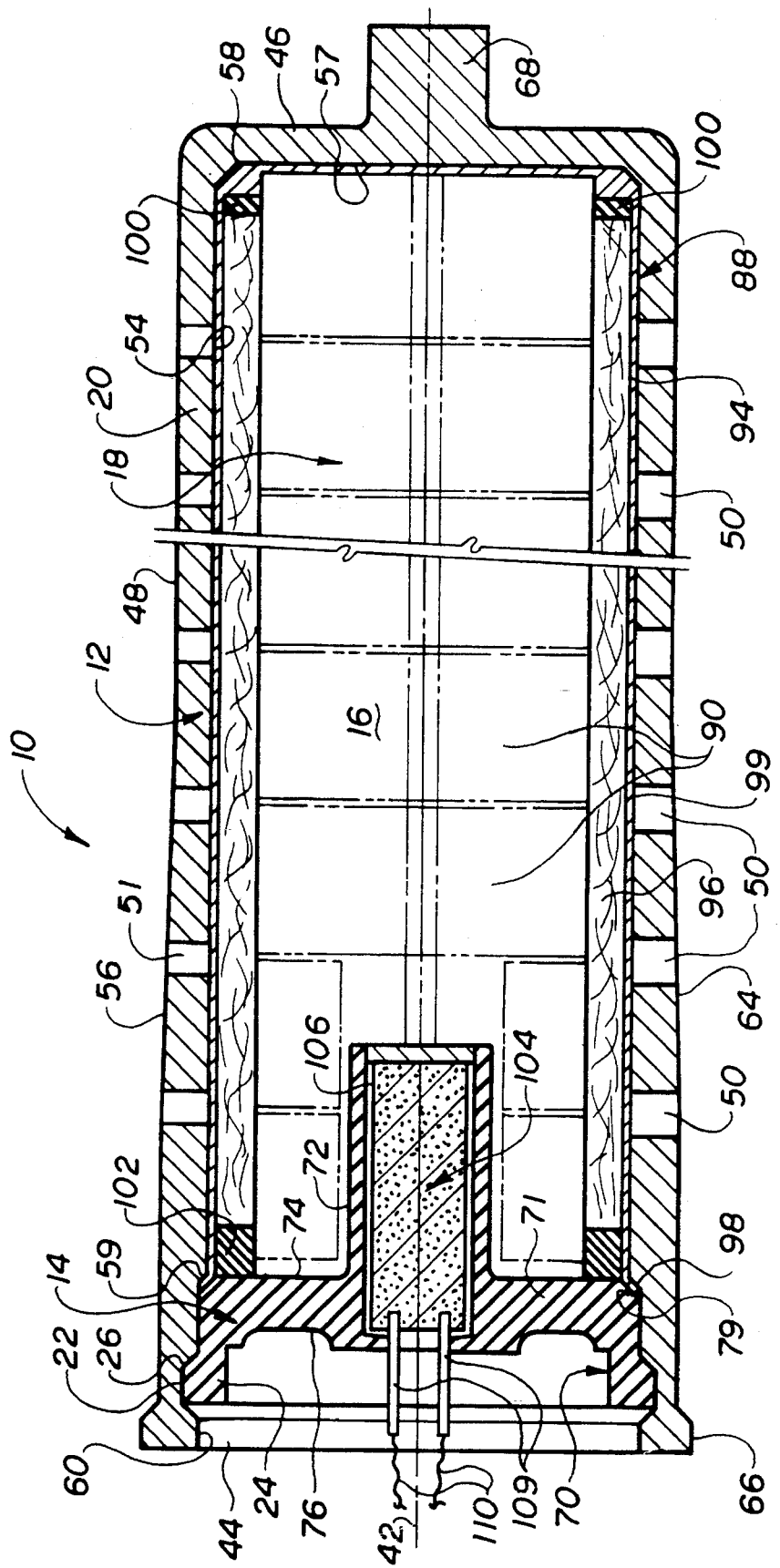
FIG. 1 is a sectional view of an inflator according to present invention, the inflator including first and second housing members which are coupled together to form a closed chamber.

Referring now to the drawings in detail, and initially to FIG. 1, an inflator 10 according to the present invention is shown. The inflator 10 comprises a first housing member 12, a second housing member 14 coupled to the first housing member 12 to form a closed chamber 16, and a source of inflation fluid 18 contained within the chamber 16. The first housing member 12 includes a container 20 which has a recess 22. The second housing member 14 includes a coupling portion 24 which has an integral projection 26 tightly received within the recess 22. When coupled together in this manner, the inflator housing members 12 and 14 cannot be easily uncoupled with standard tools, and the inflator 10 is therefore essentially tamperproof.

Figure 3A:
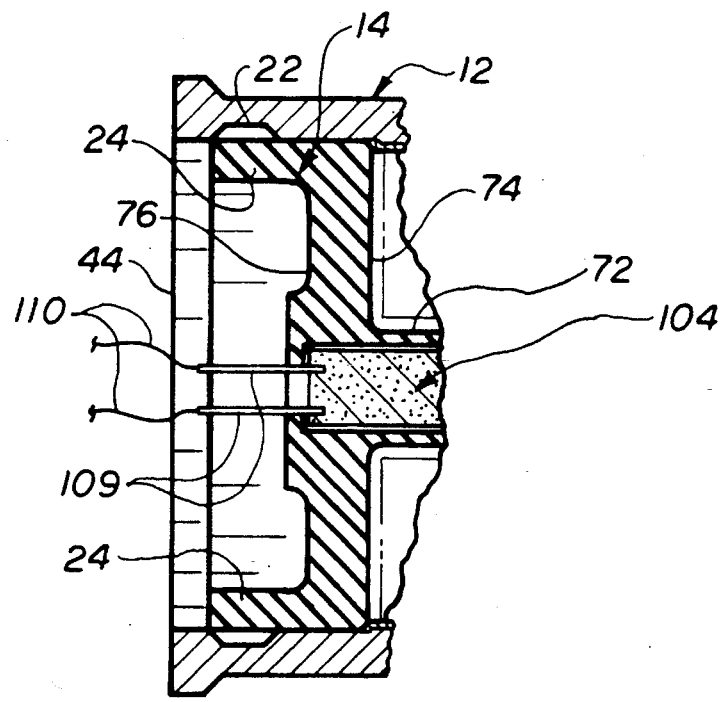
FIG. 3A is an enlarged sectional view of the second housing member and the relevant portions of the first housing member before they have been coupled together.
Figure 3B:
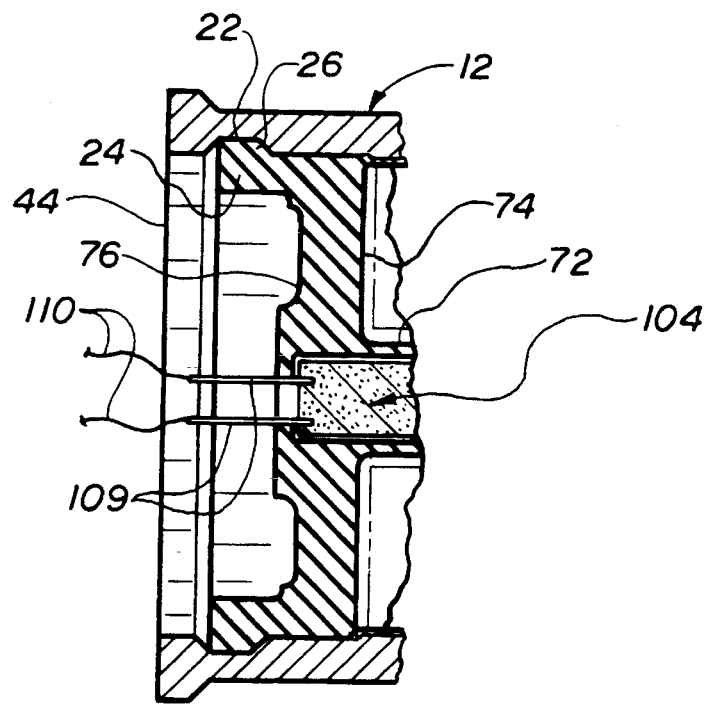
FIG. 3B is an enlarged sectional view of the second housing member and relevant portions of the first housing member after they have been coupled together.

The coupling portion 24 has a deformation pattern consistent with the housing members 12 and 14 being coupled together according to the method of the present invention. This method includes loading the fluid source 18 into the container 20; positioning the second housing member 14 so that its coupling portion 24 is adjacent to, but outside of, the recess 22 (see FIG. 3A); and mechanically deforming the coupling portion 24 towards the recess 22 to form the integral projection 26 (see FIG. 3B). In this manner, the housing members 12 and 14 are coupled together to form the closed chamber 16 for the fluid source 18. The coupling is accomplished without welding so that the time-consuming and expensive inspection procedures currently required to determine the integrity of welded coupling arrangements are unnecessary.

Figure 4A:
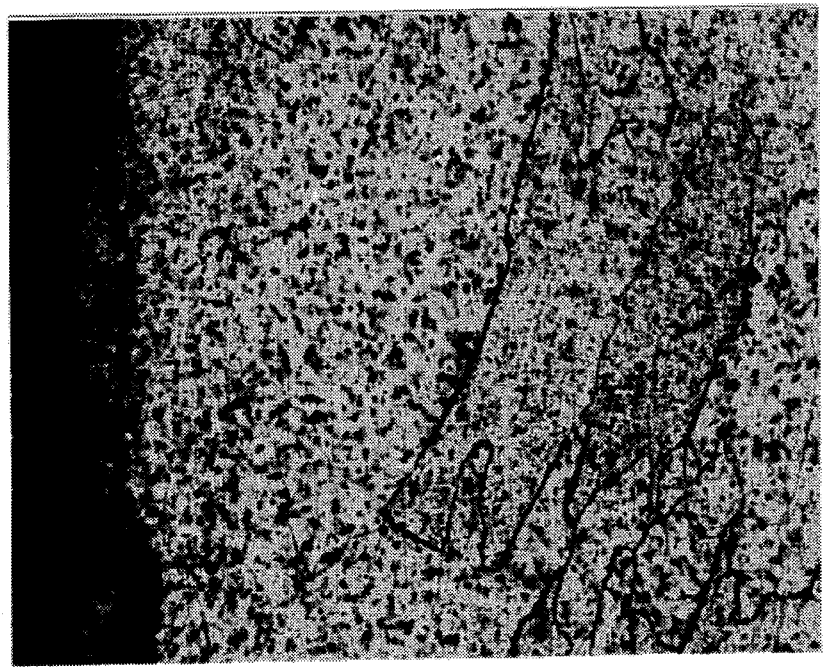
FIGS. 4A and 4B are microscopic views of a coupling portion of the second housing member.
Figure 4B:
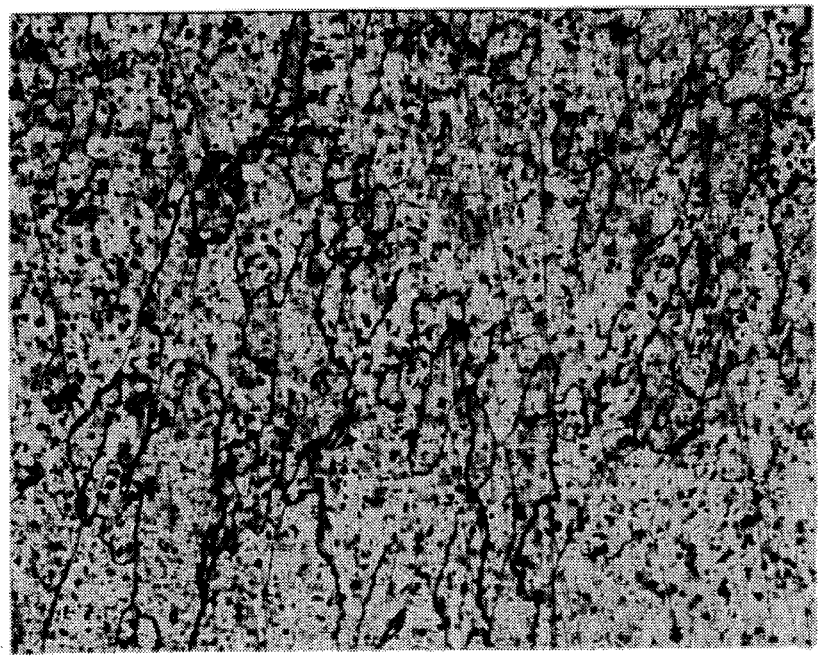

Thus, the coupling portion 24 has a deformation pattern consistent with it being initially positioned entirely outside of the recess 22 and then being mechanically displaced towards the recess 22 to form the projection 26. In other words, a metallurgic analysis of the coupling portion 24 would reveal physical or structural features corresponding to this method of coupling the housing members 12 and 14 together. Certain structural features, such as the overall geometry of the coupling portion 24, would be apparent from a visual inspection. Additional structural features, such as elongated grains, would be ascertainable by a microscopic examination of the coupling portion 24. (See FIGS. 4A and 4B which show various sections of the coupling portion 22 at a one hundred times magnification.) Still further structural features, such as edge hardness and individual grain structure would be detectable by metallurgic testing.

In the preferred embodiment, the first housing member 12 is made of 2014-T6 aluminum and the second housing member 14 is made of 6061-T6 aluminum. The first housing member 12 is formed by conventional impact extrusion techniques. Although the recess 22 is preferably machined in the housing member 12, acceptable tolerances are much greater (0.010 inch) than those associated with threaded coupling arrangements. The second housing member 14, including the coupling portion 24, is also formed by conventional impact extrusion techniques into the pre-coupling form shown in FIG. 3A. Additionally, the inflator housing members 12 and 14 may be of varying thickness (greater than 0.25 inch) so that inflator 10 may be used with both driver side and passenger side air bag assemblies.

Figure 2:
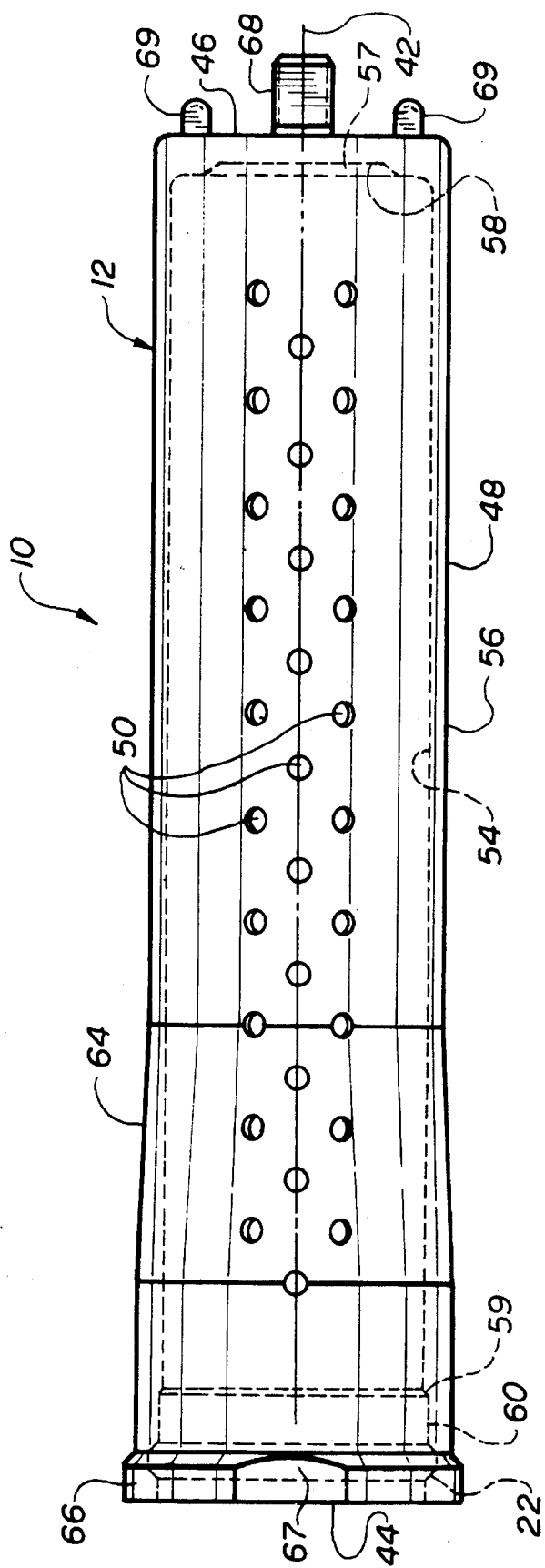
FIG. 2 is a plan view of the first housing member.

The container 20 is formed by the first housing member 12. The container 20 is cylindrical in shape and has an axial dimension substantially greater than its radial dimension. More particularly, the container 20 has an axis 42, an open end 44, an opposite closed end 46, and a substantially cylindrical wall 48 extending between the ends 44 and 46. (See FIG. 2.) The closed end 46 is preferably formed in one piece with the cylindrical wall 48, although other constructions are possible.

Primary discharge orifices 50 are located on an axially extending region of the cylindrical wall 48 and secondary discharge orifices 51 are located on a diametrically opposite region of the cylindrical wall 48. During deployment of an air bag assembly, inflation fluid will be released from the chamber 16 through the primary discharge orifices to inflate an air bag. In the event that the pressure in the chamber 16 reaches a predetermined level during this deployment, the secondary orifices 51 will release, or vent, inflation fluid from the chamber 16.

The container 20 has an inner surface 54 and an outer surface 56. The inner surface 54 follows an essentially constant cylindrical profile for most of the axial length of the container 20. However, the inner surface 54 is contoured adjacent the container's closed end 46 to form an indentation 57 which is surrounded by an annular ledge 58. Additionally, the inner surface 54 is contoured adjacent the container's open end 44 to accommodate the shape of the second housing member 14 and its coupling to the first housing member 12. This contouring includes a flared annular shoulder 59 and a tubular portion 60. The tubular portion 60 extends from the shoulder 59 to the open end 44 and includes the recess 22.

The recess 22 is a continuous planar groove which opens towards the axis 42 of the container 20. "Planar groove" in this context means a groove which is situated substantially in a plane, as opposed to a groove for a threaded coupling arrangement which by definition must be non-planar. The groove preferably forms a substantially uniform channel having a polygonal cross-sectional shape and, more preferably, forms a substantially uniform channel having a trapezoidal cross-sectional shape. This polygonal, rather than curved, sectional geometry is believed to enhance the coupling between the first and second housing members 12 and 14 by encouraging material flow.

The outer surface 56 of the container 20 defines a tapering portion 64 which slopes radially outward towards the container's open end 44. The outer surface 56 additionally defines a flange 66 which surrounds the container's open end 44 and which includes a flattened portion 67. (See FIG. 2.) The flattened portion 67 is axially aligned with the discharge orifices 50 and may be used for orientation purposes during various assembly steps.

The first housing member 12 further includes a central mounting/alignment member 68 and a pair of mounting/alignment members 69. The members 68 and 69 project outwardly from the container's closed end 46. These members may be used to align and mount the inflator 10 properly relative to other components of an air bag assembly.

The second housing member 14 comprises a closure cap 70 which closes the container's open end 44. The closure cap 70 includes a base portion 71 to which the coupling portion 24 is integrally attached. A central bore 72 extends through, and beyond, the base portion 71. As is explained in more detail below, the central bore 72 is designed to accommodate another component of the inflator 10.

The base portion 71 is essentially disk-shaped and has opposite radially extending surfaces 74 and 76. The inner surface 74 has a tapered edge 79 which is positioned adjacent the shoulder 59 of the first housing member 12. The coupling portion 24, which includes the integral projection 26, is substantially annular and extends perpendicularly from the outer surface 76 of the base portion 71.

The fluid source 18 comprises a gas generating assembly 88 which, when actuated, generates an inert, non-toxic gas such as nitrogen. The gas generating assembly 88 includes a gas generating composition 90 made of sodium azide, ferric oxide and graphite fiber. The composition 90 is in the form of disk-shaped pellets which are concentrically stacked within the container 20.

The gas generating assembly 88 additionally includes a foil can 94 and a filter 96. The foil can 94, which is cylindrical in shape, is concentrically disposed within the container 20, immediately adjacent its inner surface 54. The open end of the foil can 94 is defined by an outwardly flared rim 98 which is captured between the container's shoulder 59 and the closure cap's edge 79. Circular sections 99 of the foil can 94, which are designed to burst at a certain predetermined pressure, cover the primary discharge orifices 50 of the container 20. As is explained in more detail in U.S. patent application Ser. No. 07/577,785, filed Sep. 5, 1990 (assigned to the assignee of the present application), the thickness of the sections 99 is chosen based upon the desired rate of gas discharge from the inflator 10. Similar circular sections would cover the secondary discharge orifices 51.

The filter 96 comprises a cylindrical arrangement of filtering materials such as carbon steel wire mesh, carbon steel wool, fiberglass and ceramic felt-like materials. The filter 96, which includes two open ends, is positioned concentrically within the container 20 between the foil can 94 and the gas generating composition 90. In this manner, the inflation fluid generated by the composition 90 will travel through the filter 96 prior to passing through the primary discharge orifices 50. Compressible seal rings 100 and 102 are positioned at the axial ends of the filter 96 to prevent inflation fluid from bypassing the filter 96.

The illustrated inflator 10 additionally includes an initiator 104 which is actuated at the onset of a collision to ignite the gas generating composition 90. The initiator 104 comprises a generally tubular casing 106 which is secured within the bore 72 of the closure cap 70. The tubular casing 106 contains an ignition material and pyrotechnic material. A pair of conductor pins 109 extend from the casing 106 and are electrically connected to squib wires 110 which in turn are electrically connected to a crash sensor (not shown).

The method of making an inflator according to the present invention includes the step of providing a first housing member and a second housing member. The first housing member must have a recess and the second housing member must have a coupling portion. Additionally, one of the housing members must include a container. In the illustrated embodiment, the first housing member 12 is provided in the form shown in FIG. 2 and it includes the container 20. The second housing member 14 is provided in the pre-coupling form shown in FIG. 3A. In this pre-coupling form, the second housing member 14 is shaped and sized to be inserted through the open end 44 of the container 20. Preferably, the second housing member 14 is provided with the initiator 104 installed in the central bore 72.

The method additionally includes the step of loading a source of inflation fluid into the container. In the illustrated inflator 10, this step includes sequentially inserting the lining 94, the seal ring 100, and the filter 96 into the container 20. The gas generating composition 90 is then stacked into the circular cavity defined by the filter 96. The remaining seal ring 102 is then inserted into the container 20 and, if necessary or desired, liquid silicone sealant could be applied to the ring 102.

After the fluid source has been loaded into the container, the second housing member is situated so that its coupling portion is positioned adjacent to, but outside of, the recess. In the illustrated embodiment, this step includes inserting the closure cap 70 (in its pre-coupling form) through the container's open end 44 and positioning the cap so that its tapered edge 79 rests on the shoulder 59. In this position, the flared rim 98 of the lining 94 will be captured between the container's shoulder 59 and the closure cap's edge 79. Additionally, the coupling portion 24 will be adjacent to, but outside of, the recess 22 of the first housing member 12. (See FIG. 3A). This step may require applying pressure to the closure cap 70 in the axial direction to compress the seal rings 100 and 102 appropriately.

Figure 5:
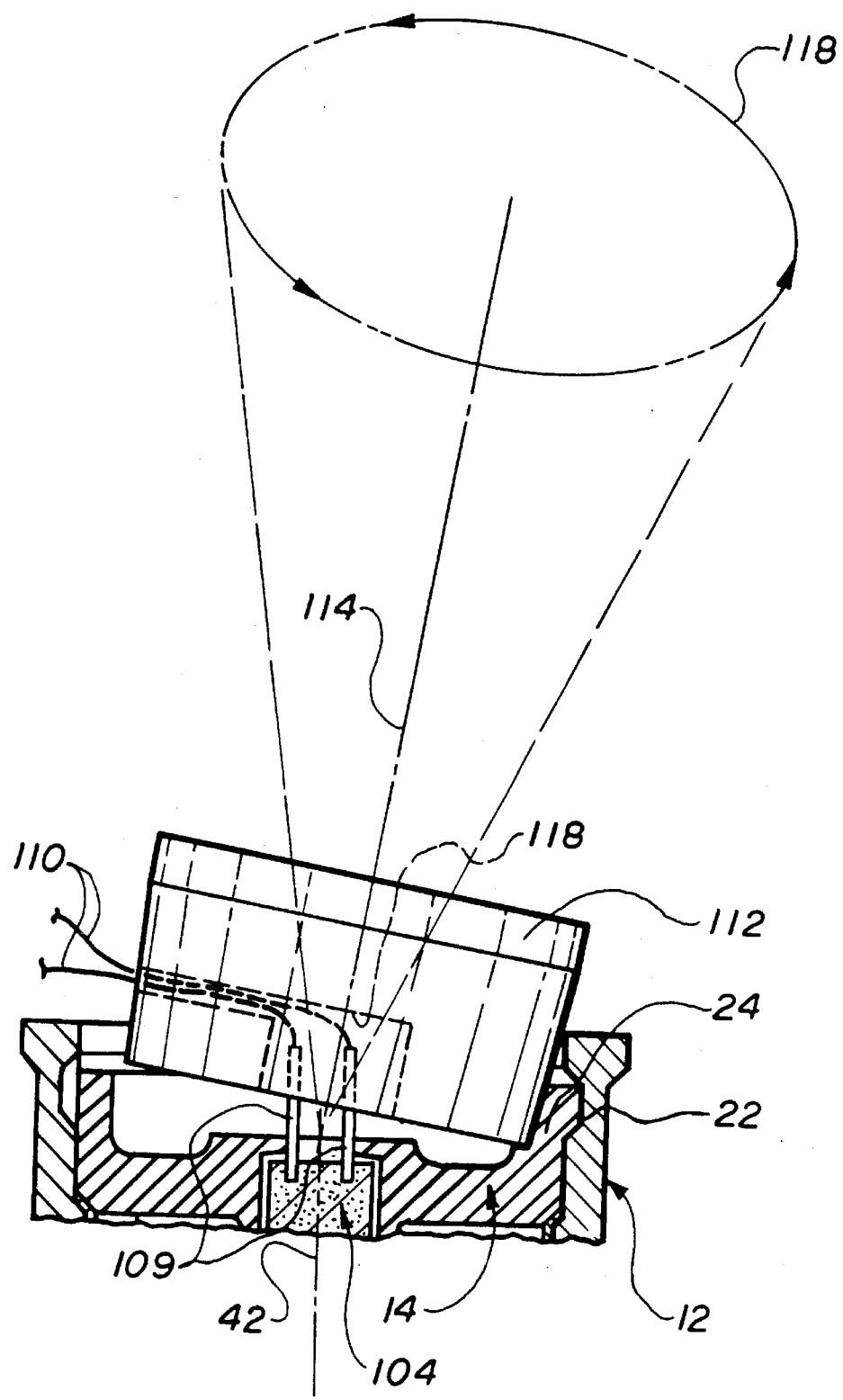
FIG. 5 is a schematic view of the preferred method of coupling the first and second housing members together.

The coupling portion 24 is then mechanically deformed towards the recess 22 to form the integral projection 26. In the preferred embodiment, this step is performed progressively by an orbital forming system which is sold under the name SpinnOmatic™ by VSI Automation Assembly of Auburn Hills, Michigan. The SpinnOmatic™ system includes a machine head (not shown) which transfers mechanical force and orbital motion to a peen tool 112. (See FIG. 5.) The peen tool 112 is roughly cylindrical in shape and is attached at one axial end to the machine head. The tool 112, which is shaped and sized to fit slightly less than snugly within the center of the annular coupling portion 24, tapers towards its distal axial end.

To form the integral projection 26, the peen tool 112 is brought to bear on the radially inner surface of the coupling portion 24. The peen tool 112 is oriented so that its axis 114 is offset slightly (approximately 3° to 6°) from the axis 42 of the container 20. The machine head then transfers mechanical force to the peen tool 112 while at the same time orbiting the peen tool 112 in the pattern shown schematically by arrow 118. It is important to note that the peen tool 112 does not rotate relative to its axis 114. Instead, the motion of the peen tool 112 is perhaps best analogized to the motion of a pestle when a pharmacist is grinding prescriptions in a mortar. Thus, a section of the peen tool 112 will remain adjacent to the same section of the coupling portion 24 throughout the orbital forming process.

During each orbit of the peen tool 112, it will systematically contact radial sections of the coupling portion 24 and a cause a minute quality of material to be deformed towards the recess 22. Thus, with each orbit of the peen tool 112, the coupling portion 24 will be progressively mechanically deformed. After numerous orbits, the coupling portion 24 will be mechanically deformed in such a manner that the integral projection 26 is formed within the recess 22.

The peen tool 112 preferably includes a notch 118 which extends from the center of the peen tool 112 through its outer radial surface. The notch 118 is preferably included to accommodate the squib wires 110 of the initiator 104 during the orbital forming process. Specifically, the orbital forming process is accomplished in two stages. In the first stage, the squib wires 110 are pulled in a first direction, the notch 118 is positioned over the wires 110, and the orbital forming process is performed. In this first stage, the section of the coupling portion 24 (approximately a 40° arc) adjacent the notch is not deformed. In the second stage, the squib wires 110 are pulled in an opposite direction, the notch is positioned over the wires 110, and the orbital forming process is repeated to deform the previously non-deformed section of the coupling portion 24.

Figure 6:
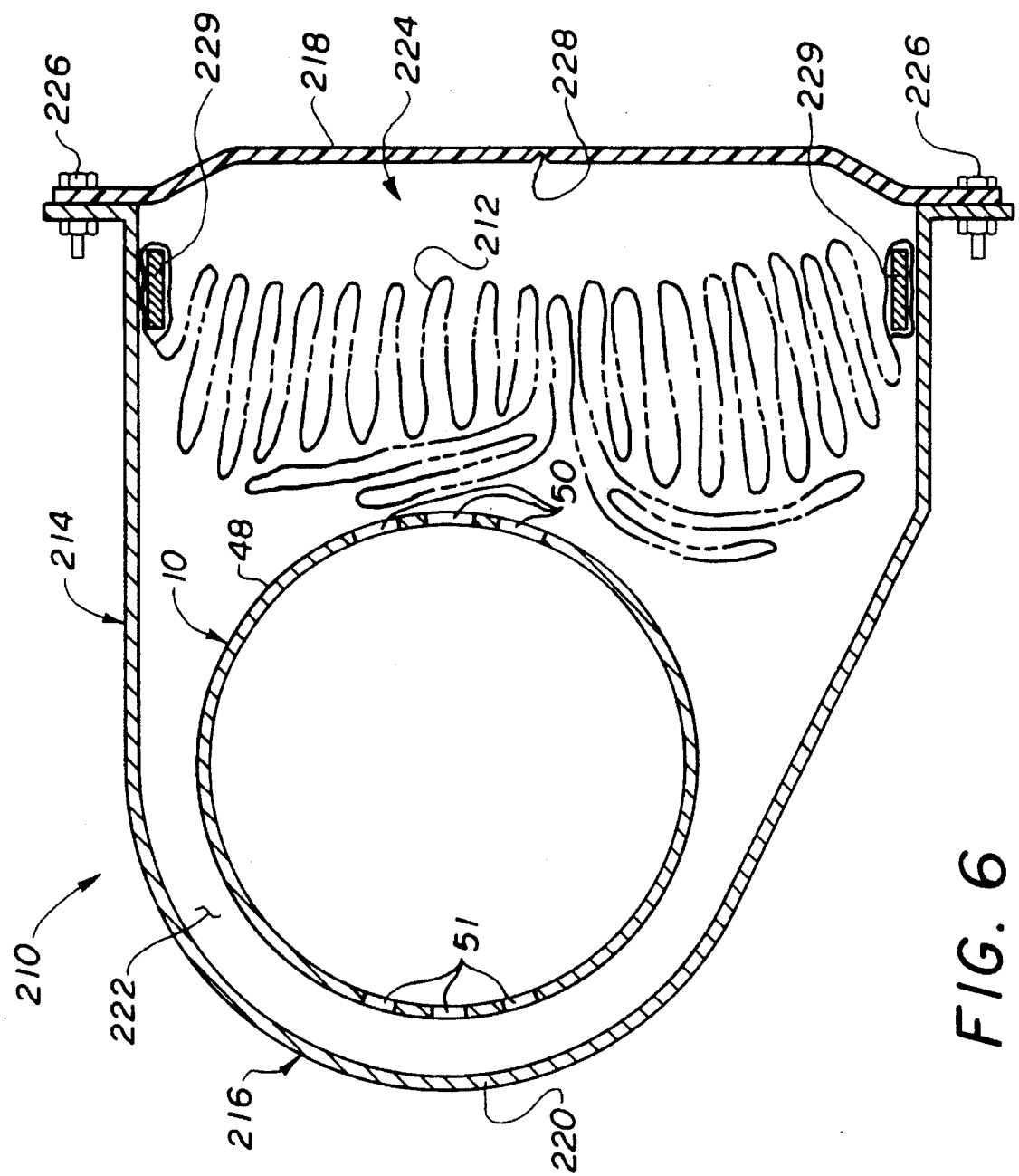
FIG. 6 is a sectional view of an air bag assembly which incorporates an inflator according to the present invention.

The inflator 10 may be incorporated into an air bag assembly, such as the passenger-side air bag assembly 210 shown in FIG. 6. The air bag assembly 210 additionally includes an inflatable air bag 212 and a receptacle 214 in which the inflator 10 and the air bag 212 are located. When the inflator 10 supplies the inflation fluid, the air bag 212 will be forced out of the receptacle 214 and inflated. In this manner, the air bag 212 will cushion a vehicle occupant against impact with a structural part of the vehicle. In the illustrated embodiment, the air bag assembly 210 is designed to be located in the instrument panel or dashboard on the passenger side of a vehicle.

The receptacle 214 preferably comprises a reaction can 216 and a cover 218. The reaction can 216 includes a main wall 220, which is roughly C-shaped in cross section, and a pair of planar side walls (not shown). The wall 220 and the side walls of the reaction can 216 together define a rectangular front opening 224. The cover 218 is coupled to the reaction can 216 by fasteners 226 to close the front opening 224. The cover 218 has a designed weakness, such a central V-shaped groove 228, to enable it to separate into segments during deployment of the air bag 212.

The reaction can 216 is adapted to be coupled to a structural part of the vehicle. Thus, the reaction can 216 constitutes a reaction device which transmits forces between the air bag assembly 210 and the vehicle. The inflator 10 is coupled to the reaction can 216 in any suitable manner. For example, the alignment/mounting members 68 and 69 could coordinate with similarly shaped openings in one of the side walls of the reaction can 216. The air bag 212, which is preferably made of a fabric such as nylon, is also coupled to the reaction can 216 in any suitable manner. In the illustrated embodiment, a retaining ring 229 is attached to the mouth (or fluid inlet) of the air bag 212 and fasteners such as rivets (not shown) couple the retaining ring 229 to the reaction can 216.

One may now appreciate that the present invention provides a coupling arrangement which may be used with inflator housing members of varying thicknesses and therefore may be used with both driver side and passenger side air bag assemblies. Additionally, the coupling arrangement eliminates the disadvantages commonly associated with threaded and/or welded coupling arrangements. Still further, the inflator coupling arrangement prevents the inflator housing members from being easily uncoupled with standard tools and is therefore essentially tamperproof.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. An inflator for an air bag assembly comprising a first housing member, a second housing member coupled to said first housing member to form a closed chamber, and a source of inflation fluid contained within said chamber;

said first housing member having an inner surface partially defining said chamber, said inner surface comprising (i) a chamber-defining portion which partially defines said chamber, and (ii) a first coupling portion lying outside of said chamber-defining portion and having a circumferential recess proximate an opening of said first housing member;

said second housing member also partially defining said chamber and having a second coupling portion which includes an integral projection which is mechanically-deformed into said recess to be tightly received within said recess.

2. An inflator as set forth in claim 1 wherein said first housing member comprises a container having an open end and wherein said second housing member comprises a closure cap for said open end.

3. An inflator as set forth in claim 1 wherein said recess comprises a substantially continuous groove.

4. An inflator as set forth in claim 3 wherein said groove forms a substantially uniform channel having a polygonal cross-sectional shape.

5. An inflator as set forth in claim 4 wherein said chamber has a longitudinal axis running the length thereof and wherein said groove opens towards said axis.

6. An inflator as set forth in claim 2 wherein said closure cap is positioned entirely within said container.

7. An inflator as set forth in claim 6 wherein said closure cap has a disk-shaped base portion and a flange projecting substantially perpendicularly from said base portion to form said coupling portion.

8. An inflator as set forth in claim 1 wherein said housing members are made of aluminum.

9. An inflator as set forth in claim 1 wherein said source of inflation fluid comprises a gas generating composition.

10. An air bag assembly incorporating an inflator as set forth in claim 1, said air bag assembly further comprising an air bag and a receptacle in which said air bag is located, said inflator being positioned to supply inflation fluid to said air bag.

11. An air bag assembly as set forth in claim 10 wherein said receptacle comprises a reaction device and wherein said inflator and said air bag are coupled to said reaction device.

12. The inflator of claim 1, wherein a thickness of said second coupling portion of said second housing member does not substantially exceed that of said first coupling portion of said first housing member.

13. A method of making an inflator for an air bag assembly comprising the steps of:

providing a first housing member having a recess on an inner surface thereof, said inner surface at least partially defining a chamber for containing a source of inflation fluid and an opening for said chamber, and a second housing member having a coupling portion positionable within said opening to close said chamber;

loading a source of inflation fluid into the chamber;

positioning the second housing member within said opening so that its coupling portion is adjacent to, but not within, said recess; and mechanically deforming the coupling portion into the recess in a direction radially outward from a longitudinal axis of said chamber by contacting said coupling portion with a tool to form an integral projection which is tightly received within the recess thereby coupling the first housing member to the second housing member to close said chamber containing the source of inflation fluid.

14. A method as set forth in claim 13 wherein said step of mechanically deforming is performed progressively around said opening of said chamber.

15. A method as set forth in claim 13 wherein said first housing member comprises a container, wherein the container has an open end, and wherein said second housing member comprises a closure cap for the open end of the container.

16. A method as set forth in claim 15 wherein said container includes:

a closed end opposite its open end;

a wall connecting the open end to the closed end;

an inner surface partially defining the chamber; and a recess located on the inner surface of the wall.

17. A method as set forth in claim 16 wherein said step of positioning the second housing member includes the step of positioning the closure cap entirely within the wall of the container.

18. A method as set forth in claim 17 wherein said closure cap includes a disk-shaped base portion and a flange projecting substantially perpendicularly from the base portion to form the coupling portion.

19. A method as set forth in claim 13 wherein said recess comprises a continuous groove opening toward said axis.

20. A method as set forth in claim 19 wherein said continuous groove forms a substantially uniform channel having a polygonal cross-sectional shape.

21. A method as set forth in claim 20 wherein said substantially uniform channel has a trapezoidal cross-sectional shape.

22. A method as set forth in claim 13 wherein said first and second housing members are made of aluminum.

23. A method as set forth in claim 13 wherein said source of inflation fluid is a gas generating composition.

24. The method of claim 13, wherein a thickness of said coupling portion of said second housing member does not substantially exceed that of a portion of said first housing member proximate said opening.

* * * * *